United States Patent [19]

Suga et al.

[11] Patent Number: 5,144,453
[45] Date of Patent: Sep. 1, 1992

[54] APPARATUS FOR DELAYING LONGITUDINAL TIME CODE SIGNAL FOR DIGITAL VIDEO TAPE RECORDER

[75] Inventors: Atsuo Suga, Kamagaya; Shigemitsu Higuchi, Fujisawa, both of Japan

[73] Assignee: Hitachi, Ltd., Tokyo, Japan

[21] Appl. No.: 336,786

[22] Filed: Apr. 13, 1989

[30] Foreign Application Priority Data

Apr. 15, 1988 [JP] Japan .................. 63-91348

[51] Int. Cl.⁵ .............................. H04N 9/79
[52] U.S. Cl. .................. 358/311; 358/335; 358/310
[58] Field of Search ............ 358/311, 319, 310, 335; 360/14.3, 14.2, 32, 72.2, 14.1, 74.4, 72.1, 72.3, 13

[56] References Cited

U.S. PATENT DOCUMENTS

| | | | |
|---|---|---|---|
| 3,647,951 | 3/1972 | Rose | 360/14.2 |
| 4,167,028 | 9/1979 | Tobey | 360/14.1 |
| 4,360,841 | 11/1982 | Mita | 360/14.3 |
| 4,360,843 | 11/1982 | Menezes et al. | 360/14.3 |
| 4,363,049 | 12/1982 | Ohtsuki et al. | 360/13 |
| 4,532,557 | 7/1985 | Larkins | 360/33.1 |
| 4,663,678 | 5/1987 | Blum | 360/14.3 |
| 4,772,966 | 9/1988 | Sharples et al. | 360/73.04 |
| 4,802,023 | 1/1989 | Williams | 360/14.3 |
| 4,835,626 | 5/1989 | Wilkinson et al. | 358/311 |

Primary Examiner—Roy N. Envall, Jr.
Assistant Examiner—Thai Tran
Attorney, Agent, or Firm—Antonelli, Terry, Stout & Kraus

[57] ABSTRACT

Disclosed is a digital video signal record/play-back apparatus in which when a time code signal is recorded/played-back onto/from a recording medium correspondingly to a video signal, the time code signal is recorded/played-back with a time delay which is given by a delay time corresponding to the time taken for signal processing necessary for the recording/play-back of the video signal.

16 Claims, 5 Drawing Sheets $t_3 = t_1 - t_r$

APPARATUS FOR DELAYING LONGITUDINAL TIME CODE SIGNAL FOR DIGITAL VIDEO TAPE RECORDER

BACKGROUND OF THE INVENTION

The present invention generally relates to a video signal record/play-back apparatus and particularly relates to a digital video signal record/play-back apparatus having a function to record/play-back a time code.

In edit of a video tape, it is important to know positions on the editing video tape. At present, in the field of broadcast industry or the like, in order to perform edit of video tapes accurately and efficiently, time codes are recorded on a video tape along its length so that the time codes are used as positional information.

As described in "TIME AND CONTROL CODE FOR VIDEO TAPE RECORDER", IEC STANDARD Publication, 461, 1986, a time code is standardized and has become generally accepted as means for correctly detecting positional information on a tape.

In broadcast stations and so on, recently, the requirement for making picture quality high has become strong as video signals have been made digital and digital-record video tape recorders for business use, etc. have begun to come out. In a digital-record video tape recorder, in order to obtain high functional property and high reliability, an analog video signal is converted into a digital signal, and the thus converted digital video signal is recorded while being subject to digital signal processing such as addition of address data indicating recorded positions of video signal data, addition of parity bits, data shuffling for uniformly distributing data in recording the data, the thus recorded digital video signal being played back through digital signal processing reverse to that performed in recording.

Since it takes much time for performing the above signal processing, a delay time appears remarkably in the signal between a video signal input terminal of an analog-to-digital (A/D) conversion circuit and a recording head in a digital-record video tape recorder when compared with a conventional analog-record video tape recorder.

When video editing is carried out by use of a time code in a conventional analog-record video tape recorder, the time taken for signal processing is negligibly small with respect to both a video signal and a time code signal so that the video signal and time code signal can be recorded/played-back with a timing relationship in agreement with that defined in the time code standard without any trouble. In a digital-recorder video tape recorder, on the contrary, it takes much time for the digital signal processing of a video signal when editing is carried out by use of a time code in the conventional recording system in which the time code is recorded in the longitudinal direction of a video tape, thus being a longitudinal time code, so that the timing relationship in recording the video signal and the time code signal on a video tape and the timing relationship in play-back of those signals may be shifted from predetermined relationships. Accordingly, if dubbing of such a video tape is repeatedly carried out, the shift in timing relationship between the video signal and time code signal to be recorded is multiplied so as to make it difficult to maintain the correspondency between the time code and the video frame scene. Further, in editing by use of a time code, when insert edit of a video signal from a play-back device is performed onto a recorded video tape of a recording device by means of an editing device, a displacement in editing point is caused between a video signal already recorded on the video tape and an input video signal to be newly recorded on the video tape so that those video signals cannot be connected at a designated editing point on the video tape even if the editing device tries to make the respective editing points of the recording device and the play-back device agree with each other at every frame while referring to the respective time codes fed from the recording device and the play-back device.

SUMMARY OF THE INVENTION

It is therefore a first object of the present invention that in a video tape recorder in which considerable signal processing time is taken in a video signal system and in which a timing lag in signal processing is caused in play-back because of separate arrangement of a rotary recording head and a play-back head, the shift in timing relationship between a video signal and a time code signal to be recorded on a tape is prevented from being increased.

It is a second object of the present invention that in the above-mentioned video tape recorder, in editing by use of a time code, the respective editing points designated in the play-back and recording devices are made coincident with each other on a time code referred to by the editing device, and a video signal to be newly recorded on a video tape in the recording device and a video signal already recorded on the same video tape are made coincident with each other at a designated editing point to thereby prevent any trouble from occurring in editing.

The above first object can be achieved by the video tape recorder in which, in order to compensate a delay time generated in a video signal system, a delay circuit is provided in a time code signal system so as to make the timing relationship between a video signal and a time code signal in recording those signals on a video tape agree with the timing relationship defined by the specification of the video tape recorder and in which a time delay setting means is provided so as to make the timing relationship between the video signal and the time code signal played-back agree with the timing relationship defined in the time code technical standard.

The above second object can be achieved by the video tape recorder which is provided with means arranged so that in editing by use of a time code in the case where the video tape recorder according to the present invention is used as a recording device, the time code signal is taken out while the delay time which has been given to a time code signal play-back system is removed.

The delay time given to a time code signal when the time code signal is recorded is set so as to make compensation for the delay time generated in the video signal recording system to thereby make the timing relationship between a video signal and a time code signal are to be recorded on a video tape agree with the specification of the table format. Further, the delay time given to a time code signal when the time code signal is played-back is set so as to make compensation for the delay time generated in the video signal system to thereby make the timing relationship between a video signal and a time code signal when they appear at an play-back output terminal agree with the time code standard. Thus, the timing of the video signal and time code signal in recording as well as in play-back can be maintained fixed so that the correspondency between a time code and the frame scene of a video signal can be kept perfectly in ordinary recording and play-back, so that the shift in timing relationship between a video signal and a time code signal to be newly recorded is not increased even if dubbing is repeatedly carried out.

Further, in the case of using the video tape recorder of the present invention as a recording device in editing by use of a time code, the play-back is performed while the delay time which has been given to the time code signal play-back system is removed. Thus, when the editing device makes the editing point proper while referring to the time code signals produced from the play-back device and the recording device in the editing system, it is possible to properly adjust the frame phase so that a video signal to be newly inserted can be correctly connected to a video signal already recorded on a video tape in the recording device so that editing can be made at a designated editing point. That is, it is possible to perform the editing by use of a time code with accuracy and without any trouble.

According to the present invention, a clock for driving the delay circuit is produced on the basis of a color subcarrier signal which is extracted from an input video signal as a reference signal for control of the system. Accordingly, no timing shift is caused between a video signal and a time code signal to be recorded even if the frequency of the input video signal varies.

Further, the present invention is applicable to a case where something other than a tape, for example, a disk, a card or the like is used as a recording medium.

According to the present invention, as described above, in a video tape recorder which has a time delay due to signal processing in a video signal system and a time shift in play-back because of separate provision of a rotary recording head and a play-back head in a rotary head, a delay circuit is provided in a time code signal system so as to give a proper time delay to the time code signal system, so that the timing relationship of the video signal and the time code signal can be made to agree with that defined in the standard. Further, since the relation between a time code and a frame signal in a video signal can be kept constant, no time shift is generated between the time code and the video signal even if dubbing is carried out several times.

Further, in the case where the video tape recorder is used as a recording device in editing by use of a time code, since the play-back is performed while the delay time which has been given to the time code signal play-back system is removed, there occurs no time shift between a video signal to be newly inserted and a video signal already recorded on a video tape in the recording device so that the editing can be performed with high accuracy.

BRIEF DESCRIPTION OF THE DRAWINGS

Other features and advantages of the present invention will be apparent from the following description taken in connection with the accompanying drawings, wherein:

FIGS. 1A and 1B illustrate an embodiment of the present invention, in which FIG. 1A shows a time code signal system and FIG. 1B shows a video signal system;

FIGS. 3A and 3B illustrate a second embodiment of the present invention, in which FIG. 3A shows a video signal system and FIG. 3B shows a time code signal system;

FIGS. 4(a) through 5(h) are diagrams for explaining the timing at various portions in FIGS. 3A and 3B;

FIGS. 6A and 6B illustrate a third embodiment of the present invention, in which FIG. 6A shows a video signal system and FIG. 6B shows a time code signal system;

FIGS. 9A and 9B illustrate the construction of the recording device in the editing system of FIG. 8 as a fourth embodiment of the present invention, in which FIG. 9A shows a video signal system and FIG. 9B shows a time code signal system;

DESCRIPTION OF THE PREFERRED EMBODIMENTS

Figure 1A:
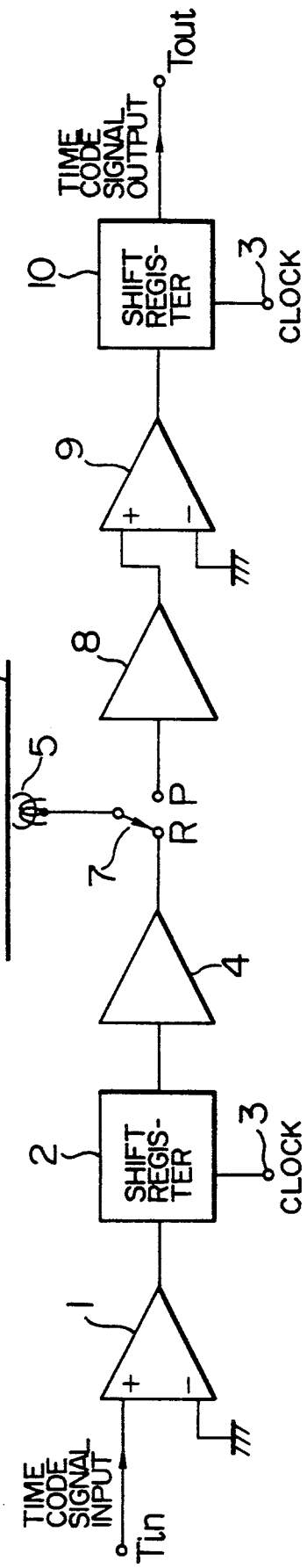

Referring to the drawings, embodiments of the present invention will be described in detail hereunder.

Figure 1B:
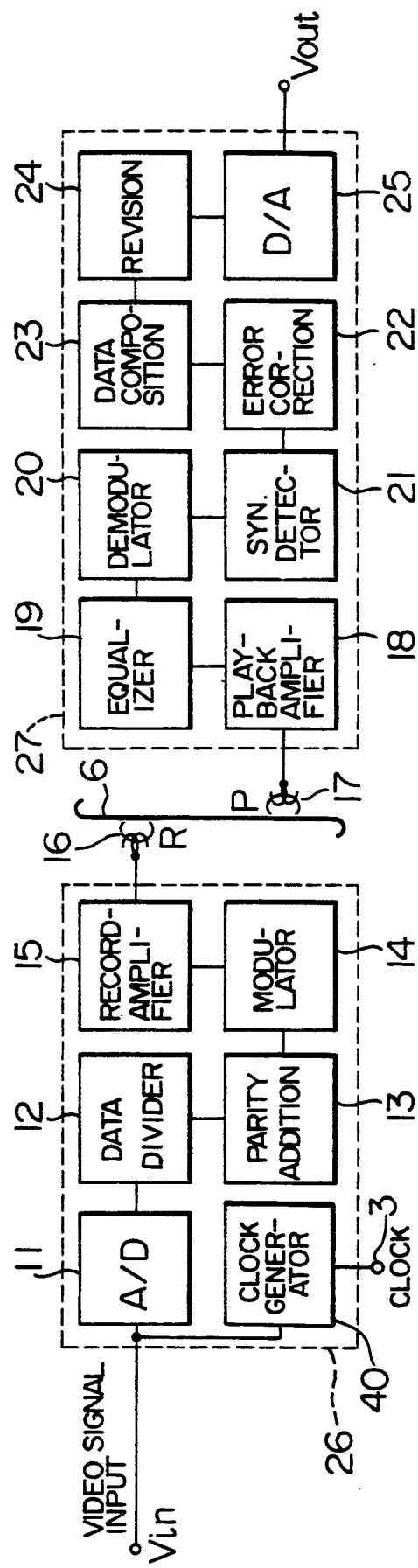

FIGS. 1A and 1B are block diagrams showing an embodiment of the present invention, that is, a digital-recording video tape recorder having a delay time due to signal processing in a video signal system, which is arranged so that a suitable delay time is given to a longitudinal time code signal system so as to make the, timing relationship between a video signal and a longitudinal time code signal be in accordance with a predetermined timing. FIGS. 1A and 1B show the time code signal system and the video signal system, respectively.

First, the configuration and operation of the time code signal system will be described.

In FIG. 1A, the reference numeral 1 designates a comparator. The minus input of the comparator 1 is connected to the earth so that a time code signal supplied to the plus input of the comparator 1 is made to be a binary signal with the earth potential as a reference level. This is for the purpose that a time code signal deteriorated in the path from other video signal equipment to the recorder through a transmission system is converted into a signal having a TTL level which is in turn transmitted to a post stage.

The reference numerals 2 and 3 designate a shift register and a clock respectively.

The shift register 2 constitutes a delay circuit for determining a delay time in the time code signal recording system and is arranged to receive a time code signal from the comparator 1 and to output the time code signal after a lapse of time represented by a product of the number of registers constituting the shift register 2 and the period of the clock 3.

The frequency of the clock 3 is selected to be sufficiently higher than the basic frequency of the time code signal. A signal produced by a clock generator 40 which multiplies, by an integral number, the frequency of a color subcarrier signal extracted from a color burst signal extracted from an input video signal in order to form a clock for A/D conversion is used as the clock 3 as shown in FIG. 1B.

The reference numerals 4, 5 and 6 designate a recording amplifier, a fixed record/play-back (R/P) head, and a video tape respectively. The recording amplifier 4 is arranged to amplitude-modulate a time code signal supplied from the shift register 2 in the same manner as an audio signal and supply the amplitude-modulated signal to the fixed record/play-back head 5 as a recording current. The fixed record/play-back head 5 is provided for performing record/play-back of the time code signal on a longitudinal track of the video tape 6.

The reference numeral 7 designates a record/play-back switch which is arranged so that the record/play-back switch 7 is connected to the recording side (R) in the condition that the video tape recorder records a time code signal, while it is connected to the play-back side (P) in the condition that the video tape recorder play back a time code signal.

The reference numeral 8 designates a play-back amplifier in which the output of the fixed record/play-back head 5 is amplified and amplitude-demodulated so that the time code signal is restored and outputted therefrom.

The reference numeral 9 designates a comparator similar to the comparator 1. The comparator 9 is provided for the purpose of converting a time code signal deteriorated in the tape head transmission system or the like into a binary signal with the earth potential as a reference so that the time code signal is wave-shaped to have a TTL level.

The reference numeral 10 designates a shift register similarly to the shift register 2. Similarly to the shift register 2, the shift register 10 constitutes a delay circuit which has a delay time represented by a product of the number of registers constituting the shift register 10 and the period of the clock 3 and which determines a delay time in the time code signal play-back system.

Although an example of the arrangement of the delay circuits constituted by shift registers is illustrated in FIG. 1A, other means, for example, using a RAM can be considered.

Next, the configuration and operation of the video signal system will be described.

Since the detail of the video signal system is not particularly necessary for the purpose of explanation of the present invention, the signal processing process of the video signal system of the digital-record video tape recorder is briefly illustrated in FIG. 1B and will be described hereunder.

In FIG. 1B, the reference numeral 11 designates an A/D (analog-to-digital) converter which is arranged to perform sampling of an input video signal with a subcarrier frequency four times as high as the frequency of a color burst signal of the input video signal so as to perform 8-bit quantization to thereby convert the input video signal into digital data.

The reference numeral 12 designates a data dividing circuit for dividing input data of one system into a plurality of signal processing systems in accordance with the number of heads or in accordance with the signal processing method.

The reference numeral 13 designates a parity addition circuit. In the case where an error is generated in digital data by, for example, a drop-out of a video tape in which play-back of the video tape becomes impossible due to a fault or dust on the video tape, it is possible to correct the error by using parity information added to the digital data by the parity addition circuit 13.

The reference numeral 14 designates a modulation circuit for converting an input digital signal into a digital signal having a format suitable for the transmission line characteristics. For example, since a DC component is not passed in a rotary head tape system in which a signal is transmitted through a rotary transformer, it is necessary to modulate an input digital signal into a signal having a format, for example, Miller-squared modulation $M^2$ used in a VTR, in which "1" and "0" are frequently repeated so as to have no DC component.

The reference numerals 15 and 16 designate a recording amplifier and a rotary recording head respectively. The recording amplifier is arranged to supply the modulated signal to the rotary recording head 16 as a recording current.

Further, by the rotary recording head 16, a video signal is recorded on a helical track of the video tape 6.

The reference numeral 17 designates a rotary play-back head which is attached to a cylinder on which the rotary recording head 16 is also attached, at a position where the rotary play-back head 17 can follow the tracing of the rotary recording head 16 in the case of normal record/play-back operation.

In this configuration, in recording a video signal, simultaneous monitoring of a signal recorded on the video tape 6 can be performed by using the rotary play-back head 17.

The reference numeral 18 designates a play-back amplifier for amplifying the output of the rotary play-back head 17.

The reference numeral 19 designates an equalizing circuit for restoring an input signal having a differential characteristic of a recording signal into the form of the recording signal, for example, by means of a transversal filter designed taking the bit rate of the signal or the transmission line characteristics into consideration.

The reference numeral 20 designates a demodulation circuit arranged to perform an operation reverse to the operation of the modulation circuit 14 so as to convert the signal format suitable to the transmission line of the tape head system into the digital signal before modulated.

The reference numeral 21 designates a synchronization detection circuit for detecting a synchronizing signal from serial data supplied thereto so as to produce 8-bit parallel digital data on the basis of the detected synchronizing signal.

The reference numeral 22 designates an error correction circuit for correcting an error in the produced video data on the basis of the parity information added in recording.

The reference numeral 23 designates a data composition circuit for composing digital data of a plurality of parallel processing systems into digital data of one system.

The reference numeral 24 designates a revision circuit in which alternative data are produced in place of the error-containing data which could not be corrected by the error correction circuit 22, for example, by use of data information or the like around the error-containing data to thereby prevent deterioration of picture quality of a picture scene due to an error in the data.

The reference numeral 25 designates a D/A (digital-to-analog) converter for converting the digital data into an analog video signal.

In the following description, with respect to the video signal system, the delay time of the whole circuit of the recording system and the delay time of the whole circuit of the play-back system are the main subject of discussion. In FIG. 1B, accordingly, the recording circuit of the video signal system including the A/D converter 11, the data dividing circuit 12, the parity addition circuit 13, the modulation circuit 14 and the recording amplifier 15 is generally referred to as a video signal recording circuit 26, and the play-back circuit of the video signal system including the play-back amplifier 18, the equalizing circuit 19, the demodulation circuit 20, the synchronization detection circuit 21, the error correction circuit 22, the data composition circuit 23, the revision circuit 24 and the D/A converter 25 is generally referred to as a video signal play-back circuit 27, thereby clarifying the focus of the following discussion.

Next, description will be made about the time for signal processing in the digital record video tape recorder shown in FIGS. 1A and 1B.

In FIG. 1B, when a video signal is applied to a video signal input terminal $V_{in}$, it takes much time till a signal to be recorded on the video tape 6 by the rotary recording head 16 has been formed in the video signal recording circuit 26. This is because the input video signal is once held in the video signal recording circuit 26 for a predetermined period of time within the video signal recording circuit 26 so that the signal to be recorded on the video tape 6 is produced on the basis of the input video signal. Further, when the video signal is played back, it takes much time in the video signal play-back circuit 27 for the signal processing till an output video signal has been formed on the basis of the output of the rotary play-back head 17. In the conventional analog-record video tape recorder, the time delay due to signal processing is so short to be negligible that no trouble is caused when the conventional analog-record video tape recorder is used in connection with another video equipment. The time delay caused in the video signal recording circuit 26 and the video signal play-back circuit 27 in the digital-record video tape recorder is however so large in comparison with the analog-record video tape recorder that the time delay causes problems peculiar to the digital-record video tape recorder.

One of the problems caused in the digital-record video tape recorder is a shift in timing relationship between a video signal and a time code signal.

The relation of timing with respect to the recording position of a video signal and a time code signal produced from any kind of video equipment is defined in the IEC Standard. Accordingly, a delay circuit is provided in the time code signal system as shown in FIG. 1A to thereby make it possible to make the timing of recording a video signal and a time code signal on a video tape and the timing of play-back of a video signal and a time code signal from a video tape satisfy the restriction of the Standard.

In the time code recording mode, the record/play-back switch 7 is connected to the recording side (R). An externally supplied time code signal is converted into a binary signal by the comparator 1 with the earth level as a reference so as to have, for example, a TTL level. Then, a time delay is given to the output of the comparator 1 by the shift register 2 the number of the registers of which is determined taking the fixed delay time generated in the video signal recording circuit of FIG. 1B into consideration. The output of the shift register 2 given the time delay is amplified by the recording amplifier 4 and then supplied to the fixed record/play-back head 5.

In the time code play-back mode, the record/play-back switch 7 is connected to the play-back side (P). After being converted into a binary signal by the comparator 9 with the earth level as a reference so as to have, for example, a TTL level, the output of the play-back amplifier 8 is given, by the shift register 10, a time delay determined taking the delay time in the video signal play-back circuit 27 of the video signal system into consideration, and then outputted as a play-back time code signal.

Figure 2:
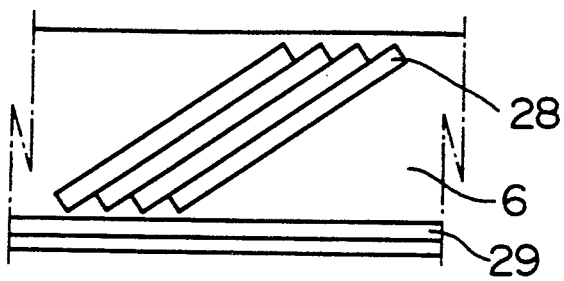
FIG. 2 is a view showing an example of the recording track pattern.

FIG. 2 shows a typical track pattern on the video tape 6 in FIGS. 1A and 1B.

As shown in FIG. 2, a video signal, a digital audio signal, and so on, are recorded on a helical track 28 by the rotary recording head 16 of FIG. 1B and a time code signal, an analog audio signal, or the like is recorded on a longitudinal track 29 by the fixed record/-play-back head 5 of FIG. 1A. Assume here that the longitudinal track 29 is used for record/play-back of a time code signal.

Next, description will be made as to the manner of how to give a time delay to the time code signal system in order to make the timing of recording a video signal and a time code signal onto a video tape and the timing of play-back of that video signal and time code signal from the video tape satisfy the restriction of the Standard, in the case where the quantity of a time delay in the video signal system is known in a digital-record video tape recorder.

Figure 3A:
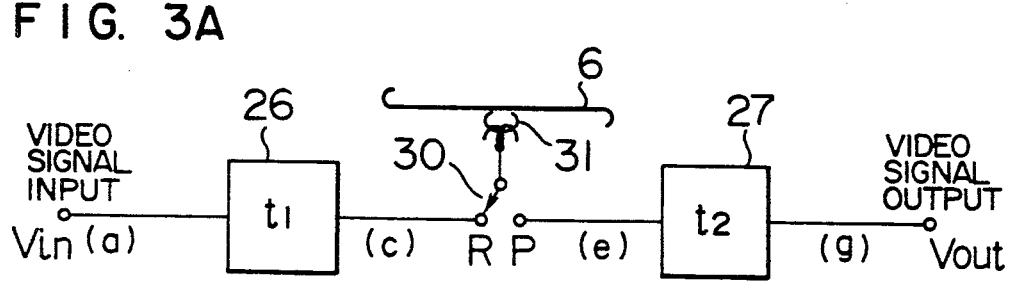
Figure 3B:
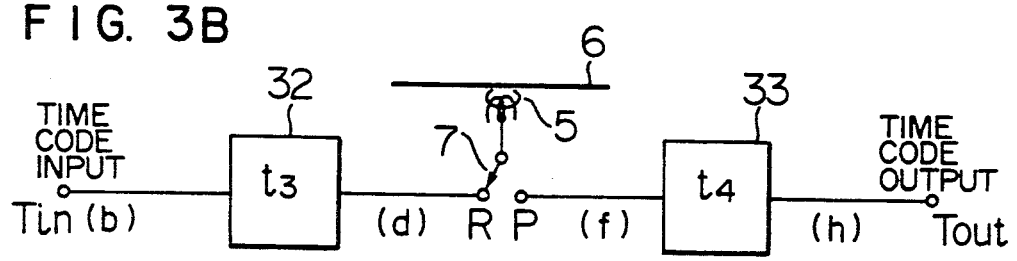

FIGS. 3A and 3B illustrate a second embodiment of the present invention constructed taking only the quantity of a time delay in the recording and play-back circuits in each of the video signal system and the time code signal system into consideration, in which FIG. 3A shows the video signal system and FIG. 3B shows the time code signal system.

In FIG. 3A, the reference numeral 26 designates a video signal recording circuit which is the same as that designated by the same reference numeral 26 in FIG. 1B. Here, assume that the quantity of a time delay of a video signal in the video signal recording circuit 26 is a known value of $t_1$.

The reference numeral 27 designates a video signal play-back circuit which is the same as that designated by the same reference numeral 27 in FIG. 1B. Here, assume that the quantity of a time delay of a video signal in the video signal play-back circuit 27 is a known value of $t_2$.

The reference numerals 30 and 31 designate a record/play-back switch and a rotary record/play-back head respectively. The construction of this embodiment shown in FIG. 3A is different in this point from the embodiment of FIG. 1B, that is, in the point that the construction of this embodiment is not provided with the recording and play-back heads for exclusive use but is arranged so that a selected one of the recording and play-back of the video tape 6 is performed by the rotary record/play-back head 31 through the record/play-back switch 30 the connection of which is switched desiredly. The record/play-back switch 30 is connected to the recording side (R) in the recording mode and to the play-back side (P) in the play-back mode.

In FIG. 3B, the reference numeral 32 designates a time code signal recording circuit including a comparator, a shift register and a recording amplifier which are the same as those designated with the reference numerals 1, 2, and 4 in FIG. 1A. Assume that the quantity of a time delay to be given to this time code signal recording circuit 32 is $t_3$.

The reference numeral 33 designates a time code signal play-back circuit including a play-back amplifier, a comparator, and a shift register which are the same as those designated with the reference numerals 8, 9, and 10 in FIG. 1A. Assume that the quantity of a time delay to be given to this time code signal play-back circuit 33 is $t_4$.

Next, the operation of the embodiment illustrated in FIGS. 3A and 3B will be described.

To clarify the description, reference will be made to timing charts of the video signal and time code signal at various portions (a), (b), (c), (d), (e), (f), (g), and (h) in FIGS. 1A and 1B.

Figure 4:
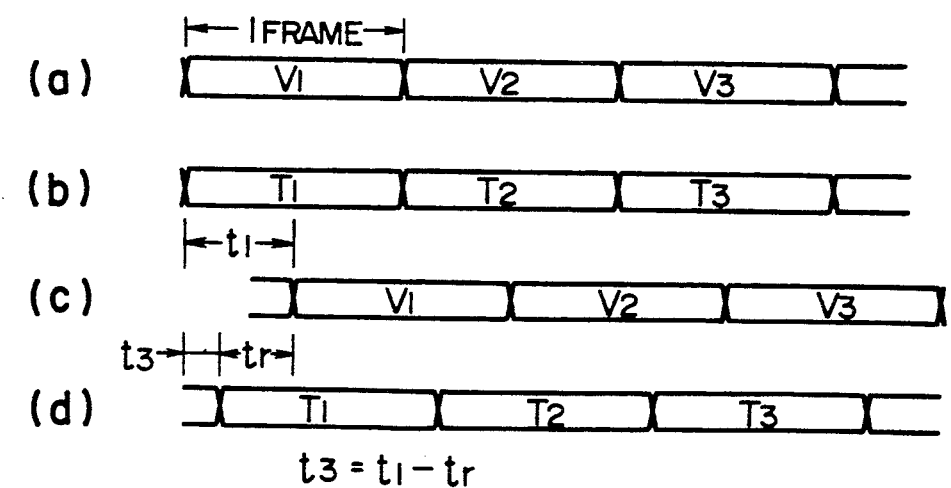

FIG. 4 is a timing chart showing the timing at the portions (a), (b), (c), and (d) in FIGS. 1A and 1B.

First, description will be made about FIG. 4.

In FIG. 4, each enclosure including a reference symbol with a subscript represents one unit frame of a video signal or a time code signal. The symbol with a subscript in each enclosure is added as a matter of convenience to distinguish the unit frames one from another.

Next, referring to the time chart of FIG. 4, the operation of the embodiment of FIGS. 3A and 3B in recording the video signals $V_1$, $V_2$ . . . and the time code signals $T_1$, $T_2$ . . . will be described hereunder. The numeral of the subscript of $V_1$, $V_2$ . . . represents the frame number.

Assume that a video signal (a) and a time code signal (b) are supplied in synchronism with each other as shown in the diagrams (a) and (b) respectively in FIG. 4. The timing of the video signal (a) and time code signal (b) in play-back is standardized. That is, for example, in the case where one picture scene is constituted by 525 scanning lines, it is defined that in play-back the video signal goes ahead of the time code signal by several scanning lines. However, the period for several scanning lines is very short, and therefore the video signal and time code signal are illustrated based on the assumption that in play back the video signal and time code signal are in synchronism with each other.

In FIGS. 3A and 3B, the input video signal (a) is given the delay time $t_1$ by the video signal recording circuit 26. The relation of timing at this time is shown in the diagram (c) of FIG. 4. Since the timing of a video signal and a time code signal to be recorded on a tape is defined only in the system specification of a video tape recorder, the video signal is not always in synchronism with the time code signal.

In the video tape recorder according to the present invention, it is defined in the standard that a time code signal goes ahead of a video signal by a time $t_r$ when those signals are recorded on a tape. Accordingly, the timing of recording the time code signal on the tape must go ahead, by the time $t_r$ as shown in the diagram (d), of the timing of recording the video signal on the tape shown in the diagram (c). To this end, it is required that the delay time $t_3$ to be given to the time code signal recording circuit 32 satisfies the following equation (1).

$$t_3 = t_1 - t_r \quad (1)$$

Further, by use of the relation of timing at the portions (e), (f), (g) and (h) in FIGS. 3A and 3B, the operation of the embodiment of FIGS. 3A and 3B in play-back of the video and time code signals will be described hereunder.

Figure 5:
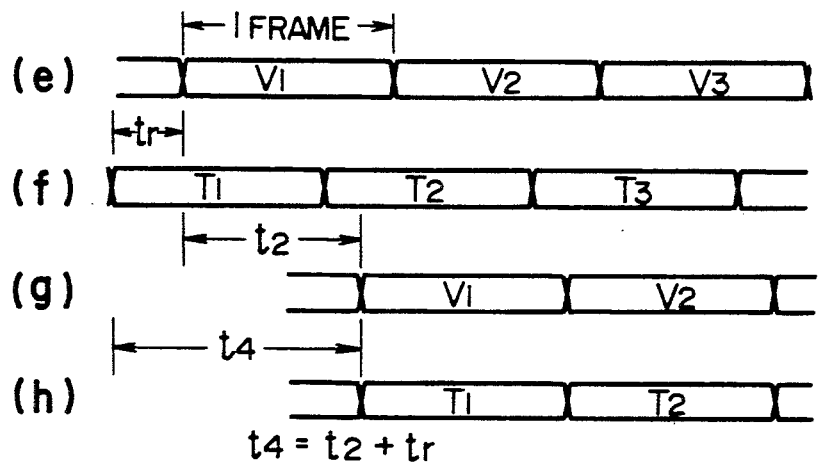

FIG. 5 is a timing chart of the video signal and the time code signal played back by the rotary record/play-back head 31 and the fixed record/play-back head 5 of FIGS. 3A and 3B, respectively. As shown in the diagrams (e) and (f) of FIG. 5, the time code signal goes ahead of the video signal by the time $t_r$ in the same manner as the timing when the video signal and the time code signal are recorded on the tape.

As shown in FIG. 3A, the video signal obtained from the rotary record/play-back head 31 is given the delay time $t_2$ by the video signal play-back circuit 27 and then outputted as a play-back signal. The timing at this time is shown in the diagram (g) in FIG. 5.

Since the video signal and the time code signal at the play-back signal output terminal must be in synchronism with each other, the timing of the time code signal at the play-back signal output terminal must be as shown in the diagram (h) in FIG. 5. To this end, it is required that the delay time $t_4$ to be given to the time code signal play-back circuit 33 in FIG. 3B satisfies the following equation (2).

$$t_4 = t_2 + t_r \quad (2)$$

In the case where the delay time $t_3$ and $t_4$ is equal to or longer than the period of one frame, it is considered that the time data of the time code signal is newly reformed so as to perform fine adjustment of the timing by the delay circuit. For example, in order to make a compensation for a time delay corresponding to one and a half frames, with respect to a time code signal for one frame, it will do that the time data of the time code signal is changed into the time data one frame before and a time delay corresponding to half frame is given by the delay circuit.

Thus, it is possible to save the memory capacity required to implement the delay circuit.

As described above, in a video tape recorder in which the recording/play-back of a video signal is performed by use of the rotary record/play-back head 31 and the respective delay times of the video signal recording circuit 26 and the video signal play-back circuit 27 are $t_1$ and $t_2$ as illustrated in FIGS. 3A and 3B, the respective delay times to be given to the time code signal recording circuit 32 and time code signal play-back circuit 33 are set to $t_3$ and $t_4$ expressed by the respective equations (1) and (2), whereby it is possible to make the timing of recording/play-back of a video signal and a time code signal onto/from a recording medium agree with a predetermined timing. Thus, the timing of the video signal and the time code signal can be maintained fixedly and no time lag is generated between the time code and the frame scene if dubbing is carried out repeatedly in the video tape recorder according to the present invention.

Next, description will be made about the manner of how to give a time delay to a time code signal system in a video tape recorder in which recording and play-back of a video signal is not performed commonly by a single recording/play-back head but a recording head and a play-back head are provided for exclusive use for performed the recording and play-back of a video signal.

Figure 6A:
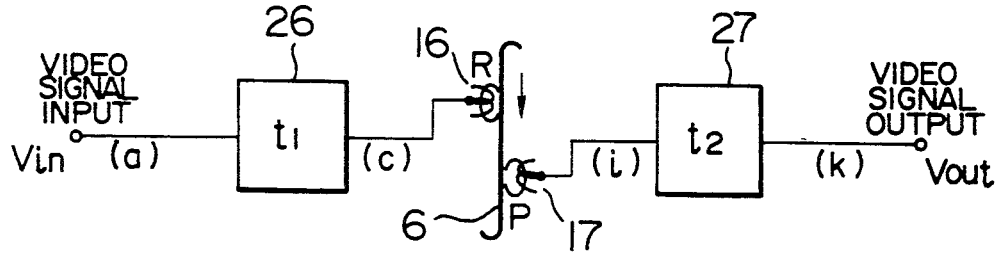
Figure 6B:
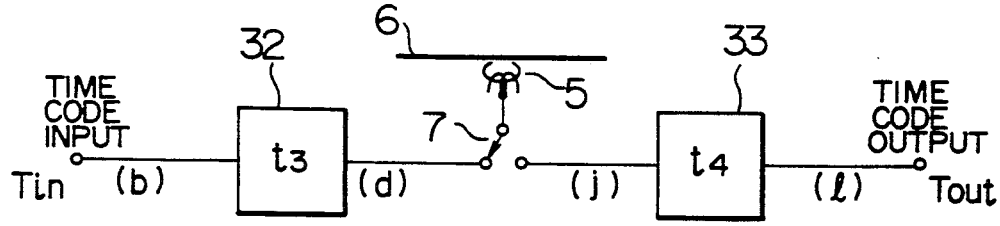

FIGS. 6A and 6B illustrate a third embodiment of the present invention constructed taking only the respective delay times in the video signal system and the time code signal system into consideration, in the case where the recording and play-back of the video signal are carried out by use of the respective recording and play-back heads for exclusive use, in which FIG. 6A shows the video signal system and FIG. 6B shows the time code signal system.

The configuration of the third embodiment of FIGS. 6A and 6B is different only in the head arrangement in the video signal system from that of the second embodiment of FIGS. 3A and 3B. Accordingly, description will be made as to only this different point, that is, the head arrangement.

In FIG. 6A, the reference numerals 16 and 17 designate a rotary recording head and a rotary play-back head. These heads 16 and 17 are provided separately at different positions on one and the same cylinder. Further, these heads 16 and 17 are arranged so that the rotary play-back head 17 can follow the tracing of the rotary recording head 16 in the case of normal record/play-back operation.

The operation of other parts in FIGS. 6A and 6B is the same as or similar to that in FIGS. 3A and 3B, and therefore the description about it will be omitted here.

The operation of the third embodiment illustrated in FIGS. 6A and 6B will be described hereunder.

The relation of timing in recording at the portions (a), (b), (c) and (d) of FIGS. 6A and 6B is the same as that shown in FIG. 4 and therefore the illustration thereof is omitted.

Figure 7:
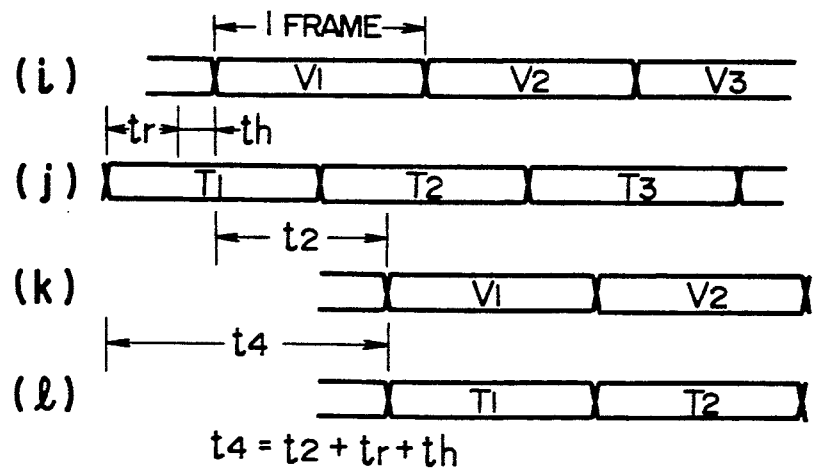
FIG. 7 is a diagram for explaining the timing at various portions in FIGS. 6A and 6B.

FIG. 7 shows the relation of timing at the portions (i), (j), (k) and (l) in FIGS. 6A and 6B in the signal play-back operation. In recording a video signal and a time code signal on a tape, it is required to record those signals at such a timing that the time code signal goes ahead of the time code signal by a time of $t_r$.

In play-back of those signals, in the case where a single head is used for both recording and play-back in each of the time code signal system and the video signal system, the video signal and the time code signal are played-back with the timing the same as that in the recording operation. In the case where there are provided two heads for exclusive use for recording and play-back respectively, that is, the rotary recording head 16 and the rotary play-back head 17 as shown in FIG. 6A, a time lag due to the different attached positions of these two heads must be taken into account. Assuming that this time lag is $t_h$, the relation of the timing of the video signal output from the rotary play-back head 17 in FIG. 6A and the time code signal output from the record/play-back switch 7 in FIG. 6B becomes as shown in the diagrams (i) and (j) of FIG. 7 so that the time code signal goes ahead of the video signal by a time of $t_r + t_h$.

Further, in FIG. 6A, the video signal is given the time delay of $t_2$ in the video signal play-back circuit 27 and then outputted therefrom ($V_{out}$). The timing at this time is shown in the diagram (k) of FIG. 7.

In the case where the video signal and the time code signal are outputted as play-back signals, those signals must be in synchronism with each other. Accordingly, the time code signal ($T_{out}$) must be outputted at the timing as shown in the diagram (l) of FIG. 7. To this end, it is required that the delay time $t_4$ to be given to the time code signal play-back circuit 33 in FIG. 6B satisfies the following equation (3).

$$t_4 = t_2 + t_r + t_h \quad (3)$$

That is, a delay time which is longer by the time lag due to the difference in attaching position between the rotary recording head 16 and the rotary play-back head 17 than that in the embodiment of FIGS. 3A and 3B must be given to the time code signal play-back circuit 33 of FIG. 6B.

Next, description will be made about the case where editing is performed by use of a time code.

Figure 8:
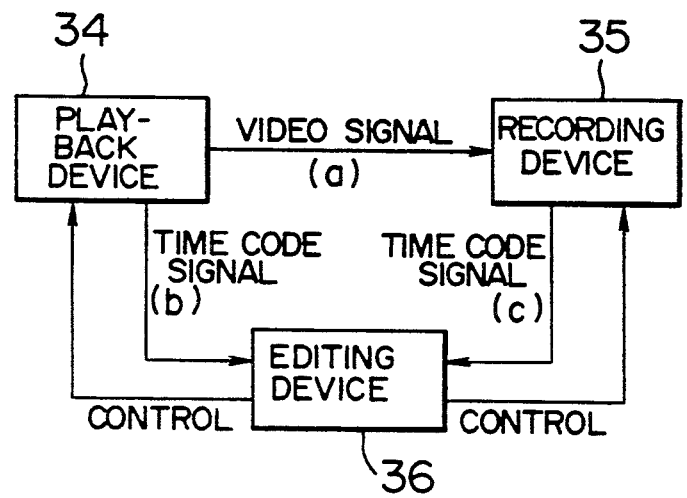
FIG. 8 is a block diagram showing an example of the editing system.

FIG. 8 is a block diagram illustrating an editing system on the basis of a time code signal. The video signals outputted from a play-back device are digital or analog signals in this system.

In FIG. 8, the reference numeral 34 designates a play-back device. The video signal output and time code signal output of the play-back device 34 are in synchronism with each other.

The reference numeral 35 designates a recording device which is a video tape recorder having a delay time in its video signal system.

The reference numeral 36 designates an editing device for performing editing while controlling the play-back device 34 and the recording device 35 so that the respective time code signals outputted from the play-back device 34 and the recording device 35 are in synchronism with each other.

Figure 9A:
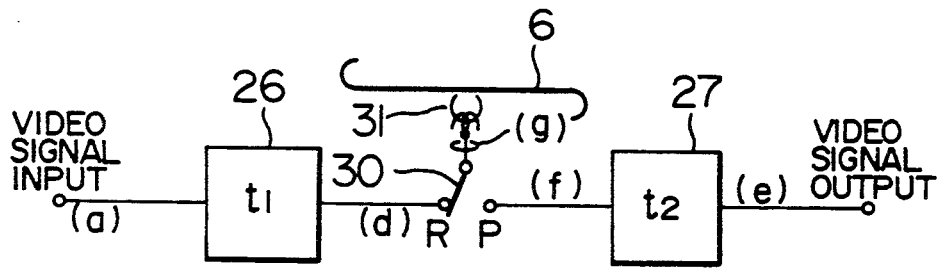
Figure 9B:
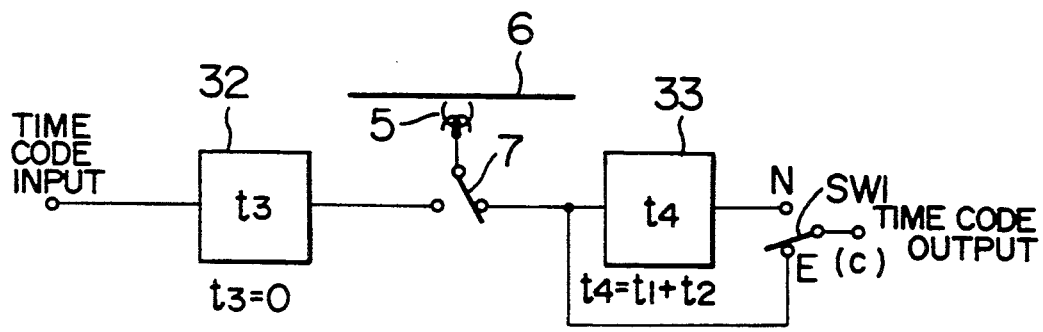

FIGS. 9A and 9B are block diagrams illustrating the recording device 35 as a fourth embodiment of the present invention, in which FIG. 9A shows a video signal system and FIG. 9B shows the time code signal system.

This embodiment has a feature in that a switch SW1 for bypassing the time code signal play-back circuit 33 is provided in the time code signal system in the video tape recorder of FIGS. 9A and 9B. The SW1 acts as a edit mode change-over switch and the SW1 is automatically switched in accordance with the operation mode of the video tape recorder.

In the video tape recorder of FIGS. 9A and 9B, the SW1 is connected to the edit side (E) when the video tape recorder is made to operate in the insert edit mode in which an editing point of a video tape 6 is designated and an external input video signal is recorded on the video tape 6 from the designated editing point, while the SW1 is connected to the normal side (N) when video tape recorder is in the mode other than the above edit mode. The time code signal play-back circuit 33 is bypassed by the SW1 so as to output the time code signal without giving any delay time in the edit mode, while the time code signal is outputted with the delay time of $t_4$ given by the time code signal play-back circuit 33 so that the time code signal is synchronized with the video signal output in play-back operation in the mode other than the edit mode. FIGS. 9A and 9B illustrate the case where the respective delay times $t_1$ and $t_3$ are $t_1 = t_r$ and $t_3 = 0$ to facilitate the explanation.

In the following, examples of timing in the cases where a delay time is given to the time code signal system and where no delay time is given to the time code signal system are shown, and description will be made as to the reason why the recorder must operate in the condition where no delay time is given to the time code in the edit mode.

Figure 10:
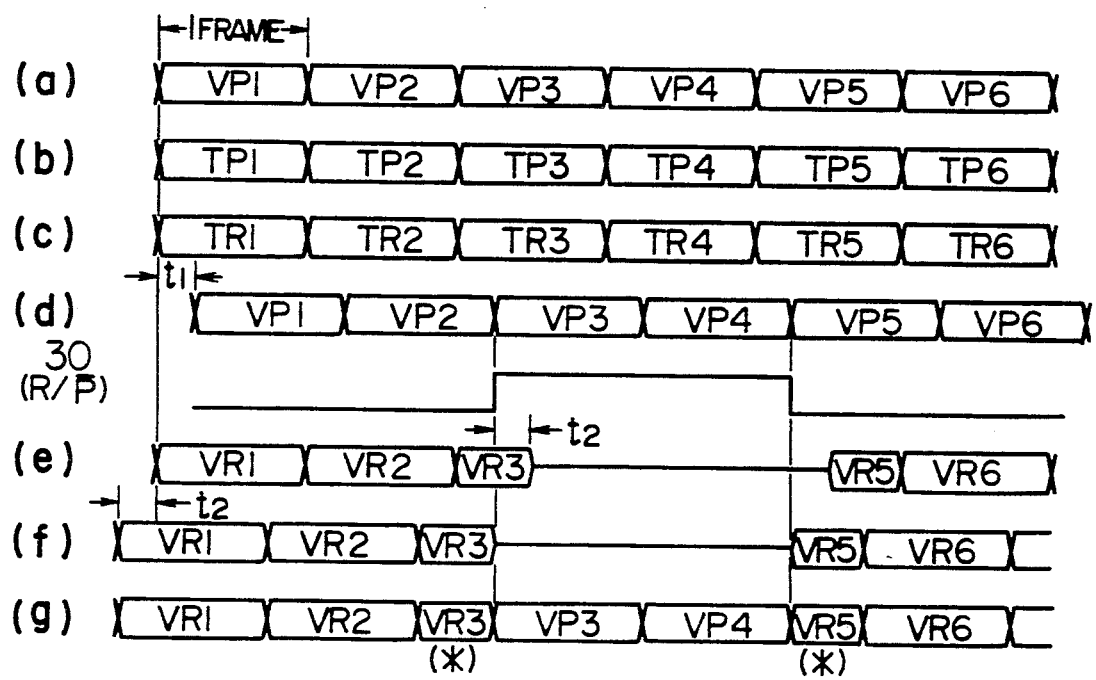
FIG. 10(a)–(g) is a timing chart when a time delay $t_4$ is inserted in the recording device of FIGS. 9A and 9B.

FIG. 10 shows the relation of timing at various portions in FIGS. 8, 9A and 9B when a time delay is given to the time code signal system in the recording device. In FIG. 10, the reference symbols represent as follow:

VP ... a video signal played-back from the play-back device;
TP ... a time code signal played-back from the play-back device;
VR ... a video signal already recorded on a tape loaded on the recording device; and
TR ... a time code signal played-back from the -continued

| recording device. |

Here, the illustrated example is a case of insert edit in which the video signals VP3 and VP4 are recorded in place of video signals VR3 and VR4. The video signal (a) and the time code signal (b) are played-back from the play-back device in synchronism with each other. As the result of control by the editing device, the time code signal (c) played-back from the recording device and the time code signal (b) from the play-back device are in synchronism with each other.

The video signal (a) played-back from the play-back device is delayed by the delay time $t_1$ of the video signal recording circuit 26 of the recording 35 so that the timing of the video signal immediately before the rotary record/play-back head 31 is as shown in the diagram (d) in FIG. 10. In order to record the video signals VP3 and VP4 in the insert edit mode, the switching operation of the record/play-back switch 30 is performed keeping with the video signals VP3 and VP4. Thus the video signals VP3 and VP4 are recorded on the tape. The relation of timing with the already recorded signals will be discussed. Since the video signal (e) played-back from the recording device is in synchronism with the time code signal to be played-back, the video signal (f) immediately after played back from the rotary record/play-backed head 31 goes ahead of the video signal (e) by the delay time $t_2$ of the video signal play-back circuit 27. At this time, the signal passing the path between the rotary record/play-back head 31 and the record/play-back switch 30 is that indicated with the mark (*) in the diagram (g) of FIG. 10, and it is therefore understood that the signals VP3 and VP4 are not correctly substituted for the signals VR3 and VR4.

Figure 11:
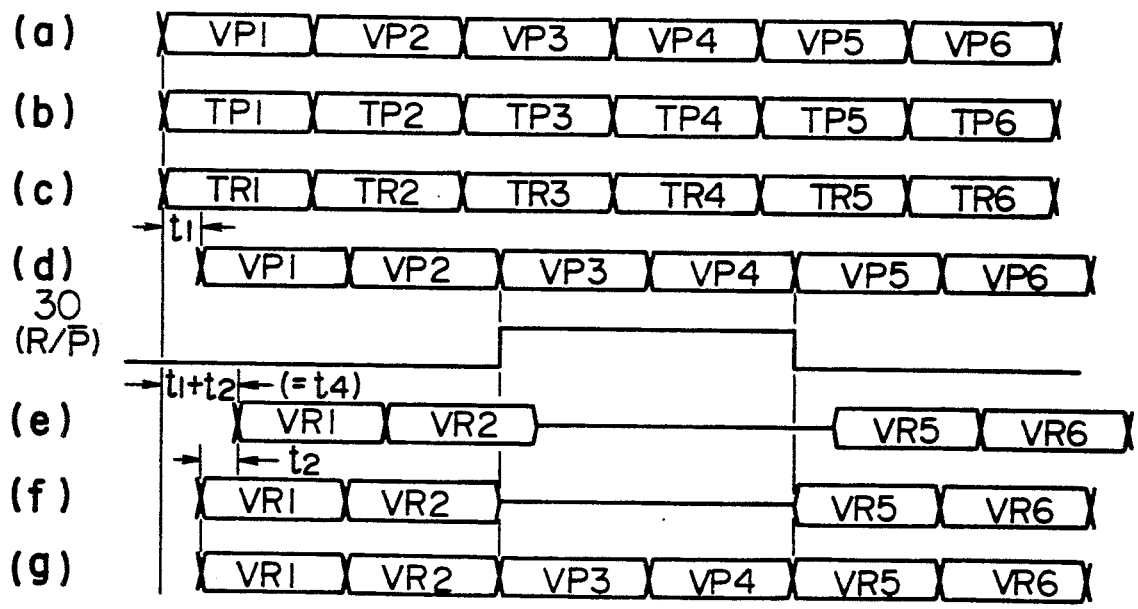
FIG. 11(a)–(g) is a timing chart when a time delay $t_4$ is not inserted in the recording device of FIGS. 9A and 9B.

FIG. 11 shows the relation of timing at various portions in FIGS. 8, 9A and 9B when a time delay is not given to the time code signal system in the recording device.

The video signal (a) played back from the play-back device, the time code signal (b) played-back from the play-back device, and the time code signal (c) played-back from the recording device are in synchronism with each other in the same manner as in the case where a time delay is inserted in the time code signal system as shown in FIG. 10.

The video signal immediately before the rotary record/play-back head 31 is delayed by the delay time $t_1$ of the video signal recording circuit 26 as shown in the diagram (d) of FIG. 11. Therefore, the record/play-back switch 30 is operated in synchronism with the respective frames of the signals VP3 and VP4 so that the signals VP3 and VP4 can be recorded.

The video signal (e) played-back from the recording device lags behind the time code signal (c) by the time $t_4(=t_1+t_2)$ because no time delay is inserted in the time code signal system. At this time, the signal passing the path between the rotary record/play-back head 31 and the record/play-back switch 30 becomes that shown in the diagram (g) of FIG. 11, so that the signals VP3 and VP4 are correctly substituted for the signals VR3 and VR4 which have been recorded on the tape.

Accordingly, it is necessary that the delay of the time code signal play-back circuit 33 be bypassed so as to output the time code signal with no delay time in the recording device in the edit mode.

Although the above embodiments have been described about the cases where a magnetic tape is used as a recording medium, the time code signal record/play-back apparatus having a delay circuit according to the present invention is applicable to a digital video signal record/play-back apparatus in which a magnetic disc, an optical disc, a magnetic card, or an optical card is employed as a recording medium, if the shape of the heads or the heads per se are changed to those proper to the specific medium.

What is claimed is:

1. A digital video signal record/play-back apparatus comprising:
   (a) a first means for recording a video signal on a recording medium;
   (b) a second means for playing-back said recorded video signal from said recording medium;
   (c) a third means for recording a longitudinal time code signal corresponding to said video signal with a first predetermined time delay on said recording medium; and
   (d) a fourth means for playing-back said recorded longitudinal time code signal from said recording medium with a second predetermined time delay.

2. A digital video signal record/play-back apparatus according to claim 1, in which said fourth means includes:
   (a) a fifth means for playing-back said recorded longitudinal time code signal with said second predetermined time delay;
   (b) a sixth means for playing-back said recorded longitudinal time code signal with no time delay;
   (c) a selection means for selecting one of said fifth means and said sixth means; and
   (d) a switch means for switching said selection means.

3. A digital video signal record/play-back apparatus according to claim 1, wherein said third means includes:
   a clock signal generation means for generating a clock signal having a frequency higher than a basic frequency of said longitudinal time code signal; and
   a delay means for providing the first predetermined time delay in units of the period of said clock signal; and
   wherein said fourth means includes:
   a clock signal generation means for generating a clock signal having a frequency higher than a basic frequency of said longitudinal time code signal; and
   a delay means for providing the second predetermined time delay in units of the period of said clock signal.

4. A digital video signal record/play-back apparatus according to claim 2, wherein said third means includes:
   a clock signal generation means for generating a clock signal having a frequency higher than a bit rate frequency of said longitudinal time code signal; and
   a delay means for providing the first predetermined time delay in units of the period of said clock signal; and
   wherein said fifth means includes:
   a clock signal generation means for generating a clock signal having a frequency higher than a bit rate frequency of said longitudinal time code signal; and
   a delay means for providing the second predetermined time delay in units of the period of said clock signal.

5. A digital video signal record/play-back apparatus according to claim 3, in which said clock signal generation means includes:
   (a) means for extracting a color burst signal from said video signal;
   (b) means for extracting a color subcarrier signal from said extracted color burst signal; and
   (c) means for forming said clock signal by multiplying the frequency of said color subcarrier signal by an integral number.

6. A digital video signal record/play-back apparatus according to claim 4, in which said clock signal generation means includes:
   (a) means for extracting a color burst signal from said video signal;
   (b) means for extracting a color subcarrier signal from said extracted color burst signal; and
   (c) means for forming said clock signal by multiplying the frequency of said color subcarrier signal by an integral number.

7. A digital video signal record/play-back apparatus according to claim 1, in which said recording medium is a magnetic tape.

8. A digital video signal record/play-back apparatus according to claim 2, in which said recording medium is a magnetic tape.

9. A digital video signal record/play-back apparatus according to claim 3, in which said recording medium is a magnetic tape.

10. A digital video signal record/play-back apparatus according to claim 4, in which said recording medium is a magnetic tape.

11. A digital video signal record/play-back apparatus according to claim 5, in which said recording medium is a magnetic tape.

12. A digital video signal record/play-back apparatus according to claim 6, in which said recording medium is a magnetic tape.

13. A digital video signal record/play-back apparatus according to claim 2, wherein said switch means switches said selection means to select said sixth means when said digital video signal record/play-back apparatus is operated in an editing mode, and switches said selection means to select said fifth means when said digital video signal record/play-back apparatus is operated in a mode other than said editing mode.

14. A digital video signal record/play-back apparatus according to claim 1, wherein the longitudinal time code signal which is recorded is inputted from an external apparatus, and wherein the recorded longitudinal time code signal which is played-back is outputted to an external apparatus.

15. A digital video signal record/play-back apparatus according to claim 1, wherein said first means and said second means share a common record/play-back head, said time code signal is recorded on said recording medium ahead of said video signal by a time $t_r$, said first predetermined time delay is a time delay $t_3$, and said second predetermined time delay is a time delay $t_4$, $t_3$ and $t_4$ being calculated according to the following expression:

$$t_3 = t_1 - t_r$$

$$t_4 = t_2 + t_r$$

wherein $t_1$ is a time delay in said first means due to processing said video signal, and $t_2$ is a time delay in said second means due to processing said recorded video signal.

16. A digital video signal record/play-back apparatus according to claim 1, wherein said first means comprises a recording head, said second means comprises a play-back head, said time code signal is recorded on said recording medium ahead of said video signal by a time $t_r$, said first predetermined time delay is a time delay $t_3$, and said second predetermined time delay is a time delay $t_4$, $t_3$ and $t_4$ being calculated according to the following expressions:

$$t_3 = t_1 - t_r$$

$$t_4 = t_2 + t_r + t_h$$

wherein $t_1$ is a time delay in said first means due to processing said video signal, $t_2$ is a time delay in said second means due to processing said recorded video signal, and $t_h$ is a time lag due to a difference between a position of the recording head and a position of the play-back head.

* * * * *